(12) United States Patent
James et al.

(10) Patent No.: US 11,374,689 B2
(45) Date of Patent: *Jun. 28, 2022

(54) MISSION-CRITICAL COMMUNICATION LINKS FOR INDUSTRIAL CONTROL SYSTEMS

(71) Applicant: Airbus Defence and Space Limited, Stevenage (GB)

(72) Inventors: Ray James, Newport (GB); Keith Travis, Newport (GB); Stephen Williams, Newport (GB); Kevin Jones, Newport (GB)

(73) Assignee: Airbus Defence and Space Limited, Stevenage (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/081,631

(22) Filed: Oct. 27, 2020

(65) Prior Publication Data

US 2021/0075545 A1    Mar. 11, 2021

Related U.S. Application Data

(63) Continuation of application No. 15/776,706, filed as application No. PCT/GB2016/053576 on Nov. 16, 2016, now Pat. No. 10,887,054.

(30) Foreign Application Priority Data

Nov. 17, 2015 (GB) ..................................... 1520264

(51) Int. Cl.
*G06F 11/07* (2006.01)
*H04L 1/08* (2006.01)
(Continued)

(52) U.S. Cl.
CPC ............ *H04L 1/08* (2013.01); *G06F 11/0739* (2013.01); *G06F 11/0793* (2013.01); *H04L 63/0428* (2013.01); *H04L 69/40* (2013.01)

(58) Field of Classification Search
CPC .... G06F 11/0739; G06F 11/0793; H04L 1/08; H04L 63/0428; H04L 69/40
See application file for complete search history.

(56) References Cited

U.S. PATENT DOCUMENTS 7,242,766 B1 * 7/2007 Lyle .......................... H04L 9/12
380/2
9,891,978 B1 * 2/2018 Fejfar .................. G06F 11/0766
(Continued)

FOREIGN PATENT DOCUMENTS

| | | |
|---|---|---|
| CN | 101330382 | 12/2008 |
| JP | 2002319927 | 10/2002 |
| WO | 2015062812 | 5/2015 |

OTHER PUBLICATIONS

International Search Report, dated Jan. 30, 2017 priority document.

*Primary Examiner* — Jonathan D Gibson
(74) *Attorney, Agent, or Firm* — Greer, Burns & Crain, Ltd.

(57) ABSTRACT

An industrial control system includes an encryption device, a decryption device and a mission-critical communication link connecting the encryption device to the decryption device. The encryption device is configured to send encrypted messages to the decryption device over the mission-critical communication link. The system includes a failure monitor configured to monitor for a failure of the encryption device or the decryption device, and, in the event of failure, to continue the sending of the messages to the decryption device but without encrypting the messages.

19 Claims, 4 Drawing Sheets

(51) Int. Cl.
  *H04L 9/40* (2022.01)
  *H04L 69/40* (2022.01)

(56) References Cited

U.S. PATENT DOCUMENTS

| | | | |
|---|---|---|---|
| 2003/0039361 A1* | 2/2003 | Hawkes | H04N 21/26606 380/278 |
| 2007/0237332 A1* | 10/2007 | Lyle | H04L 63/0464 380/263 |
| 2010/0138534 A1 | 6/2010 | Mutnuru et al. | |
| 2013/0227648 A1* | 8/2013 | Ricci | H04W 12/088 726/3 |
| 2016/0105531 A1* | 4/2016 | Godfrey | H04L 41/0853 709/224 |
| 2016/0248586 A1* | 8/2016 | Hughes | H04L 63/08 |
| 2017/0026349 A1* | 1/2017 | Smith | H04L 45/38 |

* cited by examiner

MISSION-CRITICAL COMMUNICATION LINKS FOR INDUSTRIAL CONTROL SYSTEMS

CROSS-REFERENCES TO RELATED APPLICATIONS

This application is a continuation of U.S. patent application Ser. No. 15/776,706, filed on May 16, 2018, a national stage application, filed under 35 U.S.C. § 371, of International Patent Application No. PCT/GB2016/053576, filed on Nov. 16, 2016, which claims the benefit of the Great Britain patent application No. 1520264.1 filed on Nov. 17, 2015, the entire disclosures of which are incorporated herein by way of reference.

FIELD OF THE INVENTION

This invention relates to the field of communication links. In particular, but not exclusively, the invention relates to a method and apparatus enabling mission-critical communication links in industrial control systems, to be protected from cyber-attacks.

BACKGROUND OF THE INVENTION

One well-known way of protecting a communication link against cyber-attacks, such as intrusion attacks, is to encrypt data passing along the link. However, encryption equipment is complex and can malfunction or even fail in use.

Mission-critical communication links are links which must be kept functioning, else significant consequences ensue (the consequences will, of course, depend on the purpose of the communication link). It is important that mission-critical communication links are not compromised by intrusion attacks, and it is conventional to encrypt links to prevent compromise. However, use of encryption equipment to protect the link from intrusion attacks creates the risk that the link will fail because of malfunction or failure of the encryption equipment.

In a typical industrial control system, a supervising computer system controls a plurality of controlled devices, via programmable logic controllers (PLCs) or remote terminal unit (RTUs), with one PLC or RTU being associated with each controlled device. An example of an industrial control system is a supervisory control and data acquisition (SCADA) system. SCADA systems are often used to control large-scale industrial systems, for example manufacturing equipment (e.g., a factory production line or heavy industrial process, e.g., a steel-works) or infrastructure equipment (e.g., railway signaling and control equipment, water treatment works or electricity generation and distribution networks, including e.g., nuclear reactors). Encryption of the links between the supervising computer system and the controlled devices in industrial control systems has been proposed from time to time, but there has been a reluctance to add additional equipment, in-line between the supervising computer system and the controlled devices, that could reduce the reliability or compromise the integrity of the industrial control. Consequently, conventional industrial control systems have little or no protection against intrusion attacks. Clearly, a successful intrusion attack could have severe consequences, with an attacker potentially being able to control or disable the attacked industrial system.

It would be advantageous to provide an industrial control system in which one or more of the aforementioned disadvantages is eliminated or at least reduced.

SUMMARY OF THE INVENTION

Briefly and in general terms, the present invention provides apparatus directed towards improving the protection of communication links from intrusion attacks, while also maintaining reliability of the link.

It will be appreciated that features described in relation to one aspect of the present invention can be incorporated into other aspects of the present invention. For example, an apparatus of the invention can incorporate any of the features described in this disclosure with reference to a method, and vice versa. Moreover, additional embodiments and aspects will be apparent from the following description, drawings, and claims. As can be appreciated from the foregoing and following description, each feature described herein, and each combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Example embodiments of the invention will now be described by way of example only and with reference to the accompanying drawings, of which.

DETAILED DESCRIPTION OF THE PREFERRED EMBODIMENTS

Figure 1:
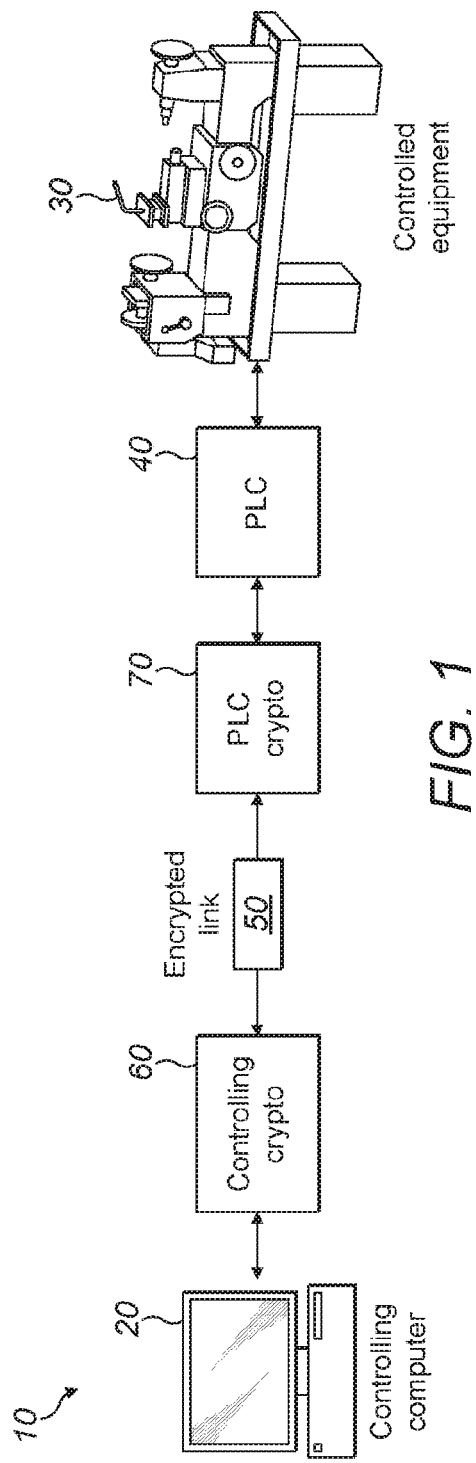
FIG. 1 is an example of a SCADA network according to an example embodiment of the invention.

Embodiments are described herein in the context of approaches to improve the reliability of communication links protected from intrusion attacks. The invention provides use of encryption in the link but mitigates failures (including malfunctions) within encryption/decryption devices, maintaining the integrity of the link. Specifically, the invention allows the link to be maintained under device failure conditions and, in some embodiments of the invention, provides a mechanism to raise an alarm to a controlling computer system.

Those of ordinary skill in the art will realize that the following detailed description is illustrative only and is not intended to be in any way limiting. Other embodiments of the present invention will readily suggest themselves to such skilled persons having the benefit of this disclosure. Reference will be made in detail to implementations as illustrated in the accompanying drawings. The same reference indicators will be used throughout the drawings and the following detailed description to refer to the same or like parts.

As previously stated, the first aspect is directed to a communication system including a first crypto device, a second crypto device and a communication link connecting the first crypto device to the second crypto device, at least one of the crypto devices being arranged to send encrypted messages to the other of the crypto devices over the communication link, wherein the system includes a failure monitor arranged to monitor for a failure of at least one of the crypto devices, and, in the event of failure, to continue the sending of the messages but without encryption.

As previously stated, the second aspect of the invention provides a method of operating a communication system, the method comprising sending encrypted messages over a communication link, monitoring for a system failure and, in the event of a system failure being detected, continuing to send the messages but sending them unencrypted.

The communication system may be a control system, for example an industrial control system, for example a SCADA network.

The communication system may further comprise one or more items of controlled equipment. The one or more items of controlled equipment may each be controlled by a PLC or RTU. There may be one PLC or RTU for each item of controlled equipment. The communication system may further comprise a controlling computer which controls the controlled equipment (directly or through the PLC or RTU).

Thus, there may be encryption in both directions between the controlling computer and the controlled equipment or PLC or RTU.

In the event of failure, the failure monitor may be arranged to send a message to the controlling computer to report the failure. Alternatively, the failure monitor may be arranged to send messages to the controlling computer while no failure is detected and to stop sending the messages when a failure is detected. The controlling computer may monitor for the no-failure messages. The controlling computer may be arranged to report failure to a user.

The first crypto device may comprise an encryption module for encrypting the messages. The first crypto device may comprise a decryption module for decrypting the encrypted messages. The second crypto device may comprise an encryption module for encrypting the messages. The second crypto device may comprise a decryption module for decrypting the encrypted messages. Messages both to and from each crypto device may be encrypted (i.e., there may be encryption in both directions between the devices). The encryption module and decryption module may share components within the crypto device.

The monitoring may be for an internal fault in the crypto devices, for example failure of the encryption module or the decryption module. The monitoring may be for loss of power; for example, the failure monitor may be arranged to check that the power supply of the first and/or second crypto device is supplying power within a predetermined tolerance range.

The crypto device may be comprised in a link end unit.

The communication link may be an Ethernet link.

At least one of the crypto devices may comprise an input port, through which incoming messages pass, and an output port, through which outgoing encrypted messages pass, and:

an encryption module connected to receive plaintext from the input port and apply an encryption algorithm to the plaintext messages, and to supply resultant cyphertext messages to the output port; or a decryption module connected to receive cyphertext messages from the input port and apply a decryption algorithm to the cyphertext messages, and to supply resultant plaintext messages to the output port; or both.

In the event of failure, the failure monitor may connect the input port to the output port so that the encryption and/or decryption module is bypassed. For example, the crypto device may include a bypass switch arrangement and the failure monitor may bypass the encryption and/or decryption module by connecting the input port to the output port by switching the bypass switch arrangement. The failure monitor may include a switch controller to control the switching.

The bypass switch arrangement may comprise a relay switch, and the relay switch may be arranged so that, when powered normally, it is in a powered state in which it connects the input port to the output port via the encryption and/or decryption module and, on loss of power, the relay switch defaults to an unpowered state in which it connects the input port to the output port while bypassing the encryption and/or decryption module. Alternatively, the bypass switch arrangement may comprise a transistor.

At least one of the crypto devices may be arranged to send messages, confirming that it is functioning correctly, to the other crypto device. The other crypto device may be arranged to monitor for receipt of the messages confirming correct functioning, and to identify as a failure event a failure to receive said messages.

The crypto device may comprise a microprocessor. The crypto device may comprise a configurable logic device, for example a field programmable gate array (FPGA). The microprocessor and/or the configurable logic device may carry out encryption and/or decryption on encrypted messages.

The microprocessor and/or the configurable logic device may be arranged to generate signals to confirm that they are functioning correctly. The confirmation signals may be monitored by the failure monitor to detect failure. The microprocessor may be arranged to generate a signal for the configurable logic device to confirm that the microprocessor is functioning correctly, to monitor the configurable logic device (for example, by monitoring a signal in the form of a changing register of the configurable logic device to confirm that the configurable logic device is functioning correctly, and to generate a signal for the failure monitor to confirm that the microprocessor and/or the configurable logic device is/are functioning correctly. The configurable logic device may be arranged to generate a signal for the microprocessor to confirm that the configurable logic device is functioning correctly, to monitor the microprocessor to confirm that the microprocessor is functioning correctly, and to generate a signal for the failure monitor to confirm that the microprocessor and/or the configurable logic device is/are functioning correctly. Having the microprocessor confirm that the configurable logic device is functioning correctly (and vice versa), rather than the microprocessor and the configurable logic device each checking themselves, guards against faults in the checking logic itself. The failure monitor may be configured to switch to sending the messages unencrypted if it does not receive the message confirming that the microprocessor and/or the configurable logic device is functioning correctly.

In an example embodiment of the invention (FIG. 1), a SCADA network 10 includes a controlling computer 20, an item of controlled equipment 30, and a PLC 40. The PLC 40 controls the equipment 30, and the PCL 40 is itself controlled by the controlling computer 20 (as is often the case, the controlling computer 20, in this example embodiment, controls many PLCs, each associated with a different item of equipment, but only one control link is shown in FIG. 1, for ease of illustration). The network 10 also includes a controlling crypto device 60, associated with the controlling computer 20, and a PLC crypto device 70, associated with the PLC 40. The controlling crypto device 60 and the PLC crypto device 70 provide an encrypted link 50 between the controlling computer system 20 and the PLC 40.

The controlling crypto device 60 and the PLC crypto device 70 each includes a mechanism to detect failure conditions (e.g., internal faults and/or loss of power) and to switch to unencrypted operation in the event that a failure condition is detected, to maintain the integrity of the link. A protocol is implemented in the controlling crypto device 60 and the PLC crypto 70, so that the controlling crypto 60 is aware of the failure and reverts back to a non-encrypted link. The controlling crypto device 60 then informs the controlling computer 20 of the failure and an alarm is raised. With this protocol, the PLC 40 itself is unaffected by the failure in the link.

Figure 2:
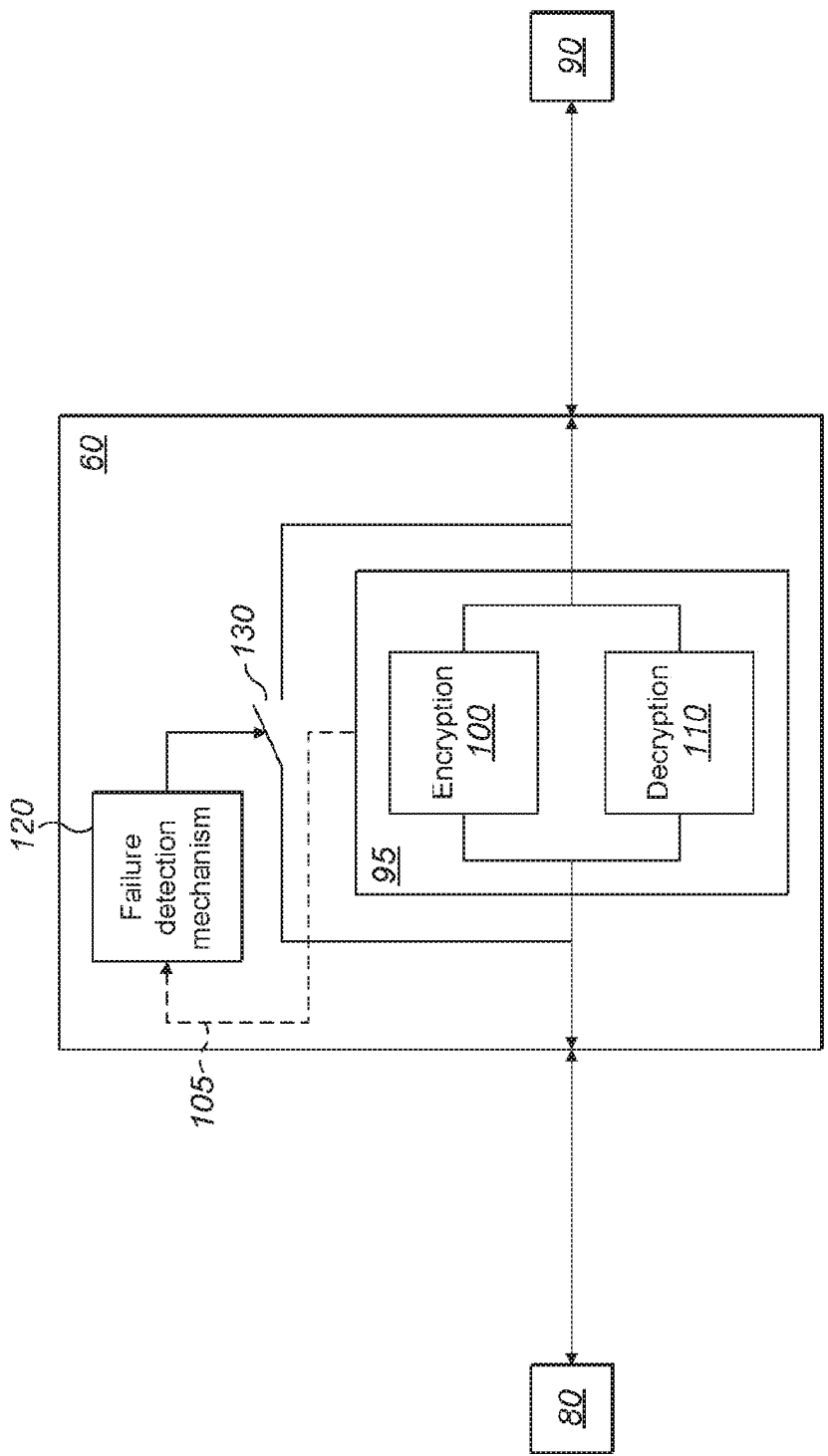
FIG. 2 is a block diagram illustrating schematically encryption apparatus forming part of the network of FIG. 1.

This aspect of the controlling crypto device 60 is illustrated schematically in FIG. 2. The controlling crypto device 60 provides an external plaintext interface 80, to which the controlling computer 20 provides messages for the PLC 40 and from which messages from the PLC are sent to the controlling computer 20, and an external cyphertext interface 90, from which the messages for the PLC 40 are sent along the encrypted link 50, and at which messages from the PLC 40 are received in encrypted form.

The controlling crypto device 60 includes a crypto module 95. The crypto module includes an encryption module 100, for encrypting messages received on the plaintext interface 80 and transmitting the resulting encrypted message to the external cyphertext interface 90, and a decryption module 110, for decrypting encrypted messages received on the cyphertext interface 90 and transmitting the resulting decrypted message to the external plaintext interface 80.

The controlling crypto device 60 also includes a failure monitor 120. The crypto module 95 transmits messages 105, confirming that the encryption module 100 and the decryption module 110 are functioning correctly. In the event of a failure of either module 100,110, the messages 105 are not transmitted. The controlling crypto device 60 detects the absence of messages 105 and activates a bypass 130, resulting in the messages received by the controlling crypto device 60 on its plaintext interface 80 being transmitted, bypassing the encryption module 100, to the PLC crypto device 70, without encryption; similarly, messages received on the cyphertext interface 90 are transmitted directly to the external plaintext interface 80, and thence to the controlling computer 20, without decryption.

Figure 3:
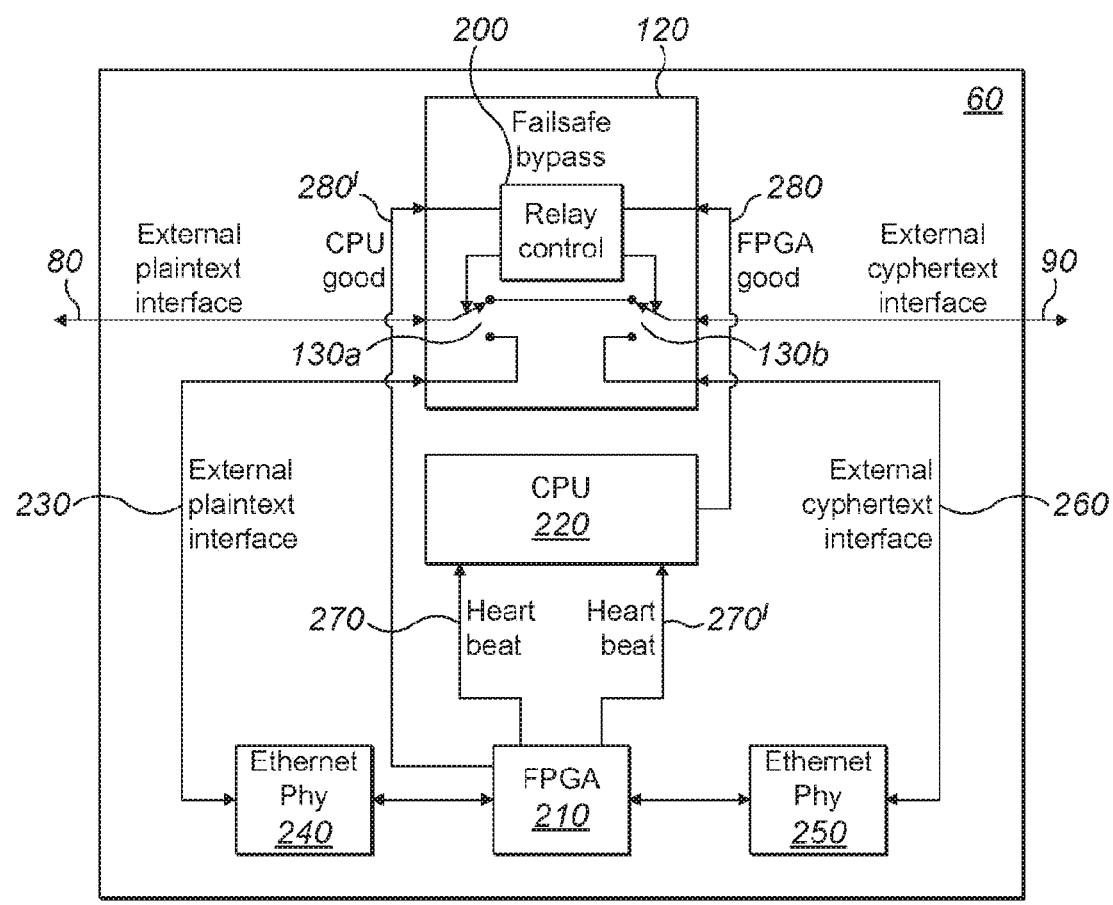
FIG. 3 is a block diagram illustrating the encryption apparatus of FIG. 2 in more detail.

The failure monitor 120 will now be described in more detail with reference to FIG. 3. The controlling crypto device 60 includes a processor (CPU) 220, which provides the encryption and decryption functions of the controlling crypto device 60. The controlling crypto device 60 also includes a field-programmable gate array (FPGA) 210, which in this example provides an Ethernet interface (in some embodiments, encryption and decryption functions may be carried out by the FPGA, speeding up the system). The FPGA 210 is connected to an Ethernet physical-layer connection 240, which provides an internal plaintext interface 230 for the FPGA 210, and another Ethernet physical-layer connection 250, which provides an internal cyphertext interface 260 for the FPGA 210. The failure monitor 120 includes a relay control 200 and two bypass switches 130a, 130b (in alternative embodiments, separate relay controls may be provided for each bypass switch).

This example system provides two basic failure protection mechanisms: protection against system power failure and protection against internal faults.

To guard against power failure in the system (or deliberate disconnection of power) the bypass function is implemented with relay switches 130a, 130b. When powered normally, the relay switches 130a, 130b connect the external plaintext interface 80 to the external cyphertext interface 90 via the internal plaintext interface 230, FPGA 210 and internal cyphertext interface 260. On loss of power, the relay switches 130a, 130b close to the normally closed position, in which the external plaintext interface 80 is connected directly to the external cyphertext interface 90, bypassing the internal plaintext interface 230, FPGA 210 and internal cyphertext interface 260.

In normal operation, the FPGA 210 sends "CPU good" signals 280' to the relay control 200 and the CPU 220 sends "FPGA good" signals 280 to the relay control 200. As long as the relay control 200 receives the "FPGA good" signals 280 and the "CPU good" signals 280', it maintains the relay switches 130a, 130b in their energized position (so that the path of messages between the external plaintext interface 80 and the external cyphertext interface 90 is via the internal plaintext interface 230, FPGA 210 and internal cyphertext interface 260, as described above).

To guard against internal faults, a "heart beat" signal 270 is generated by the FPGA 210 for the CPU 220 and another "heart beat" signal 270' is generated by the CPU 220 for the FPGA 210; thus, the "heart beat" signals enable the CPU 220 to monitor the FPGA 210 and the FPGA 210 to monitor the CPU 220.

However, if "heart beat" signal 270 is not detected by the CPU or the "heart beat" signal 270' is not detected by the FPGA, the "FPGA good" signal 280 or the "CPU good" signal 280' (respectively) is not sent. If the relay control 200 does not receive both the "FPGA good" signal 280 and the "CPU good" signal 280', it will de-energize the relay switches 130a, 130b, so that they switch to their default, normally closed, positions, in which the external plaintext interface 80 is connected directly to the external cyphertext interface 90, bypassing the internal plaintext interface 230, FPGA 210 and internal cyphertext interface 260.

Thus, in this example, the encryption and decryption provided by the FPGA 210 and CPU 220 are bypassed if the power, the FPGA 210 or the CPU 220 fails. The encryption and decryption are also bypassed if the PLC crypto 70 fails.

Figure 4:
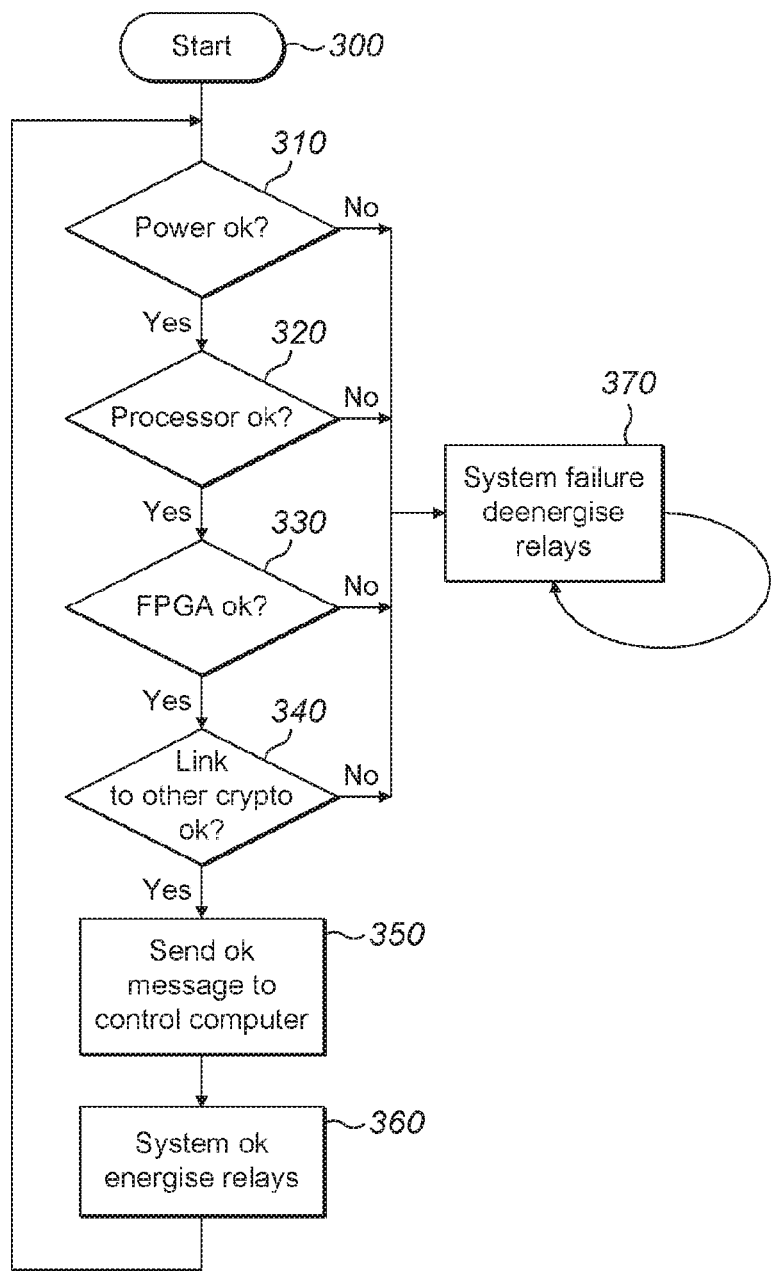
FIG. 4 is a flow chart showing steps in the operation of the encryption apparatus of FIGS. 2 and 3.

The basic functionality of the FPGA 210 and CPU 220 will now be described, with reference to FIG. 4.

At the beginning of the process (START 300), the processor 220 boots and initializes all the hardware ready for normal operation.

The processor 220 checks continuously that the power supply is within tolerance (step 310). If not, the network 10 transitions to the fail open state (i.e., bypassing FPGA 210 and CPU 220) by de-energizing the relay switches 130a, 130b (step 370).

The FPGA 210 monitors the heartbeat signal 270' from the processor 220 (step 320). The FPGA 210 transitions the link 10 to fail open (step 370) in the event that the heartbeat signal 270' goes out of tolerance.

The processor 220 monitors the heartbeat signal 270 from the FPGA 210. The processor 220 transitions the link 10 to the fail open state (step 370) in the event that the heartbeat signal 270 goes out of tolerance.

In this example, the heartbeat signals take the following form. The processor 220, reads the status of an internal register of the FPGA 210, the status changing periodically; if the status stops changing then the processor 220 will consider the FPGA 210 to be faulty and switch to "fail open". The FPGA 210, on the other hand, considers the processor 220 to have failed if the processor 220 does not access it within a pre-set timeout period. The processor 220 also has a self-checking "watchdog" function: it runs software which operates to access hardware within the processor

220 periodically. If that access does not occur within a pre-set period of time then the hardware on board the CPU is arranged to trigger a system reset, which also causes a "fail open" condition.

The controlling crypto device 60 and the PLC crypto device 40 pass "keep alive" messages between each other via the encrypted link 50. Each crypto device 40, 60 checks for receipt of the messages (step 340), and, on receipt, responds with an "OK" message, again via the encrypted link 50. If either device 60, 40 detects the keep-alive message as being out of tolerance (in this example, when the crypto device 60, 40 does not receive an OK response within a certain time) then it transitions to fail open state (step 370) and stops transmitting and responding to keep-alive message. This also ensures that the other device 60, 40 transitions to the fail open state, as it no longer receives the "OK" responses.

As long as the controlling crypto device 60 is in the normal encrypted link state it sends a regular "OK" message to the controlling computer 20 (step 350). An application running on the controlling computer 20 checks for receipt of the "OK" message. If the "OK" message goes out of tolerance then the monitoring application sets off a warning to an operator to indicate that the network 10 has transitioned to the fail open state (step 370). In this example, only the controlling crypto 60 device sends "OK" messages to the controlling computer 20. It only sends these messages if it has "OK" responses from the PLC crypto device, so the whole system is reflected in the "OK" messages from the controlling crypto device 60 to the controlling computer 20.

As long as all of the monitored conditions described above are OK, the relays remain energized (step 360), which will keep Ethernet traffic passing correctly through the cryptographic devices 60, 70. If any of the monitored functions indicates an error then, as just described, the drive to the relays 130 is removed, connecting together the external plaintext interface 80 and the external cyphertext interface 90. That will effectively remove the controlling crypto 60 from the system, and the device will then cease to generate or respond to keep-alive messages, which will cause the PLC crypto 70 at the other end of the link 50 to also enter the "fail-open" state. The controlling crypto 60 will then stop sending the OK messages to the controlling PC 20 which will cause an alarm to be issued to the user.

While the present disclosure has been described and illustrated with reference to particular embodiments, it will be appreciated by those of ordinary skill in the art that the disclosure lends itself to many different variations not specifically illustrated herein.

For example, although in the above example embodiment a single link 50 is provided for control signals between the controlling crypto 60 and the PLC crypto 70, in some other embodiments a separate link may be provided for traffic in each direction, so that in the event of a failure of encryption/decryption in one direction communications in that direction may be switched to plaintext, but communications in the other direction may continue encrypted.

Although in the above example embodiment the controlling crypto 60 is provided as a separate unit from the controlling computer 20, in other example embodiments the controlling crypto may be integrated with the controlling computer. Similarly, the controlled crypto may be integrated with the PLC or an RTU.

Also, although in the above example embodiments failure monitors 120 are provided within the controlling and PLC cryptos 60, 70, in other example embodiments, the failure monitor can be provided separately from, but in communication with, the cryptos 60, 70.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An industrial control system for controlling industrial equipment, the control system comprising:
    a first crypto device,
    a second crypto device and
    a mission-critical communication link connecting the first crypto device to the second crypto device,
        at least one of the crypto devices being configured to send encrypted messages to the other of the crypto devices over the mission-critical communication link,
    a failure monitor configured to monitor for a failure of at least one of the crypto devices, and, in the event of failure, to continue the sending of the messages but without encryption to ensure continued functioning of the mission-critical communication link and control of the industrial equipment,
    wherein the failure monitor includes a relay switch arrangement having an energized position and a default de-energized position, wherein in normal operation, the relay switch arrangement remains in the energized position such that messages are relayed via an encryption and/or decryption module in the at least one crypto device, and
    wherein in the event of a failure, the relay switch arrangement switches to the de-energized position to bypass the encryption and/or decryption module.

2. The system as claimed in claim 1, wherein the second crypto device is one of a plurality of controlled crypto devices, and the system further comprises a plurality of items of controlled industrial equipment, each controlled crypto device associated with one or the plurality of items of controlled industrial equipment.

3. The system as claimed in claim 1, wherein the failure monitor is configured to send messages to a controlling computer while no failure is detected and to stop sending the messages when the failure of at least one of the crypto devices is detected or the failure monitor is configured to send, in the event of the failure, a message to the controlling computer to report the failure.

4. The system as claimed in claim 2, wherein the first crypto device is a controlling crypto device, and wherein there is a separate mission-critical communication link between the controlling crypto device and each of the controlled crypto devices.

5. The system as claimed in claim 2, further comprising a PLC or RTU between each controlled crypto device and associated item of controlled equipment.

6. The system as claimed in claim 1, wherein there is encryption of messages sent in both directions between the controlling crypto device and the controlled crypto devices.

7. The system as claimed in claim 1, wherein at least one of the crypto devices comprises an input port, through which incoming messages pass, and an output port, through which outgoing encrypted messages pass, and further comprising:
   (i) an encryption module connected to receive plaintext from the input port and apply an encryption algorithm to the plaintext messages, and to supply resultant cyphertext messages to the output port; or
   (ii) a decryption module connected to receive cyphertext messages from the input port and apply a decryption algorithm to the cyphertext messages, and to supply resultant plaintext messages to the output port; or
   (iii) both.

8. The system as claimed in claim 7, wherein the monitoring is for failure of the encryption module or decryption module, or for loss of power.

9. The system as claimed in claim 7, wherein, in the event of the failure, the failure monitor connects the input port to the output port so that the encryption and/or decryption module is bypassed.

10. The system as claimed in claim 9, wherein the failure monitor includes a bypass switch arrangement and the failure monitor bypasses the encryption and/or decryption module by connecting the input port to the output port by switching the bypass switch arrangement.

11. The system as claimed in claim 10, wherein the bypass switch arrangement comprises the relay switch.

12. The system as claimed in claim 11, wherein the relay switch is arranged so that, when powered normally, it is in a powered state in which it connects the input port to the output port via the encryption and/or decryption module and, on loss of power, the relay switch defaults to an unpowered state in which it connects the input port to the output port while bypassing the encryption and/or decryption module.

13. The system as claimed in claim 1, wherein at least one of the crypto devices is configured to send messages, confirming that it is functioning correctly, to the other crypto device.

14. The system as claimed in claim 1, wherein the first crypto device comprises a microprocessor and a configurable logic device.

15. The system as claimed in claim 1, wherein the failure monitor is included in the first crypto device or the second crypto device.

16. The system as claimed in claim 15, wherein both the first crypto device and the second crypto device include a failure monitor.

17. The industrial control system of claim 1, wherein the failure comprises a power loss, or a failure of a field programmable gate array in at least one of the crypto devices, or a failure of a processor in at least one of the crypto devices, or a failure of a programmable logic controller in at least one of the crypto devices.

18. A method of operating an industrial control system for controlling industrial equipment, the method comprising:
   sending encrypted messages over a mission-critical communication link,
   monitoring for a system failure with a failure monitor, and,
   in the event of a system failure being detected by the failure monitor, continuing to send messages, but sending the messages as unencrypted messages to ensure continued functioning of the mission-critical communication link and control of the industrial equipment,
   wherein the failure monitor includes a relay switch arrangement having an energized position and a default de-energized position, wherein in normal operation, the relay switch arrangement remains in the energized position such that messages are relayed via an encryption and/or decryption module in the at least one crypto device, and
   wherein in the event of a failure, the relay switch arrangement switches to the de-energized position to bypass the encryption and/or decryption module.

19. An industrial control system comprising:
   a controller associated with a first crypto device,
   a plurality of items of controlled equipment, each associated with a second crypto device, and
   a mission-critical communication link connecting the first crypto device to the second crypto device,
      at least one of the crypto devices being configured to send encrypted messages to the other of the crypto devices over the mission-critical communication link,
   a failure monitor configured to monitor for a failure of at least one of the crypto devices, and, in the event of failure, to continue the sending of the messages but without encryption,
   wherein the failure monitor includes a relay switch arrangement having an energized position and a default de-energized position, wherein in normal operation, the relay switch arrangement remains in the energized position such that messages are relayed via an encryption and/or decryption module in the at least one of the crypto devices, and
   wherein in the event of a failure, the relay switch arrangement switches to the de-energized position to bypass the encryption and/or decryption module.

* * * * *